US012211383B1

(12) United States Patent
Myers

(10) Patent No.: US 12,211,383 B1
(45) Date of Patent: Jan. 28, 2025

(54) APPARATUS AND A METHOD FOR GENERATING A SPATIAL RECOMMENDATION

(71) Applicant: Better Parking LLC, Gainesville, FL (US)

(72) Inventor: Neil Myers, Gainesville, FL (US)

(73) Assignee: Better Parking LLC, Gainesville, FL (US)

( * ) Notice: Subject to any disclaimer, the term of this patent is extended or adjusted under 35 U.S.C. 154(b) by 0 days.

(21) Appl. No.: 18/615,903

(22) Filed: Mar. 25, 2024

(51) Int. Cl.
*G08G 1/14* (2006.01)

(52) U.S. Cl.
CPC ............. *G08G 1/147* (2013.01); *G08G 1/141* (2013.01)

(58) Field of Classification Search
CPC ....... G08G 1/147; G08G 11/141; H04L 67/02
USPC ........................................................ 340/392.2
See application file for complete search history.

(56) References Cited

U.S. PATENT DOCUMENTS 10,719,554 B1 * 7/2020 Davis .................... G06F 16/901
11,403,947 B2 8/2022 Higuchi et al.
11,631,327 B2 4/2023 Higuchi et al.
11,809,506 B1 * 11/2023 Paiz ......................... H04L 67/02
2005/0060088 A1 * 3/2005 Helal ............... G08B 13/19684 701/532
2012/0100867 A1 * 4/2012 Liang ................. G06Q 30/0261 455/456.1
2014/0152792 A1 * 6/2014 Krueger ............... A61B 5/4863 348/78
2014/0266804 A1 9/2014 Asadpour
2021/0209331 A1 * 7/2021 Grant ................... G08G 5/0086

FOREIGN PATENT DOCUMENTS

IN 202311059787 A 10/2023
IN 202311075511 A 12/2023

* cited by examiner

*Primary Examiner* — Hung T Vy
(74) *Attorney, Agent, or Firm* — Caldwell Intellectual Property Law

(57) ABSTRACT

An apparatus for generating a spatial recommendation is disclosed. The apparatus includes at least a processor and a memory connected to the processor. The processor is instructed to receive a user dataset comprising. The processor is instructed to receive a raw data from a plurality of sensors. The processor is instructed to identify a spatial dataset by organizing the raw data. The processor is instructed to store the spatial dataset in an index structure by implementing an indexing system as a function of the organized raw data, wherein the indexing system is further configured to dynamically adjust the index structure in response to additional raw data. The processor is instructed to determine a spatial recommendation by querying the index structure as a function of the user dataset. The processor is instructed to transmit the spatial recommendation to a remote device.

20 Claims, 11 Drawing Sheets

APPARATUS AND A METHOD FOR GENERATING A SPATIAL RECOMMENDATION

FIELD OF THE INVENTION

The present invention generally relates to the field of data mining and data management. In particular, the present invention is directed to an apparatus and a method for generating a spatial recommendation.

BACKGROUND

The advent of smart city initiatives have significantly transformed urban mobility and storage management. The development of smart parking solutions has sought to address issues related to storage management by utilizing digital technologies to optimize parking space utilization and improve the experience. However, existing systems frequently fall short in delivering personalized spatial recommendations that account for the diverse needs and preferences of individual users. Additionally, existing systems also fail to provide an accurate analysis of utilization of the storage spaces.

SUMMARY OF THE DISCLOSURE

In an aspect, an apparatus for generating a spatial recommendation is disclosed. The processor is instructed to receive a user dataset comprising at least a current location of the user. The processor is instructed to receive raw data from a plurality of sensors. The processor is instructed to identify a spatial dataset by organizing the raw data. The processor is instructed to store the spatial dataset in an index structure by implementing an indexing system as a function of the organized raw data, wherein the indexing system is configured to dynamically adjust the index structure in response to additional raw data. The processor is instructed to determine a spatial recommendation by querying the index structure as a function of the user dataset. The processor is instructed to transmit the spatial recommendation to a remote device.

In another aspect, a method for generating a spatial recommendation is disclosed. The method includes receiving, using at least a processor, a user dataset. The method includes receiving, using the at least a processor, a raw data from a plurality of sensors. The method includes identifying, using the at least a processor, a spatial dataset by organizing the raw data as a function of the user dataset. The method includes storing, using the at least a processor, the spatial dataset in an index structure by implementing an indexing system as a function of the organized raw data, wherein the indexing system is configured to dynamically adjust the index structure in response to additional raw data. The method includes determining, using the at least a processor, a spatial recommendation by querying the index structure as a function of the user dataset. The method includes determining, using the at least a processor, a spatial recommendation by querying the index structure.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for generating a spatial recommendation. The processor is instructed to receive a user dataset comprising at least a current location of the user. The processor is instructed to receive a raw data from a plurality of sensors. The processor is instructed to identify a spatial dataset by organizing the raw data as a function of the user dataset. The processor is instructed to store the spatial dataset in an index structure by implementing an indexing system as a function of the organized raw data, wherein the indexing system is further configured to dynamically adjust the index structure in response to additional raw data. The processor is instructed to determine a spatial recommendation by querying the index structure. The processor is instructed to transmit the spatial recommendation to a remote device. Exemplary embodiments illustrating aspects of the present disclosure are described below in the context of several specific examples.

Figure 1:
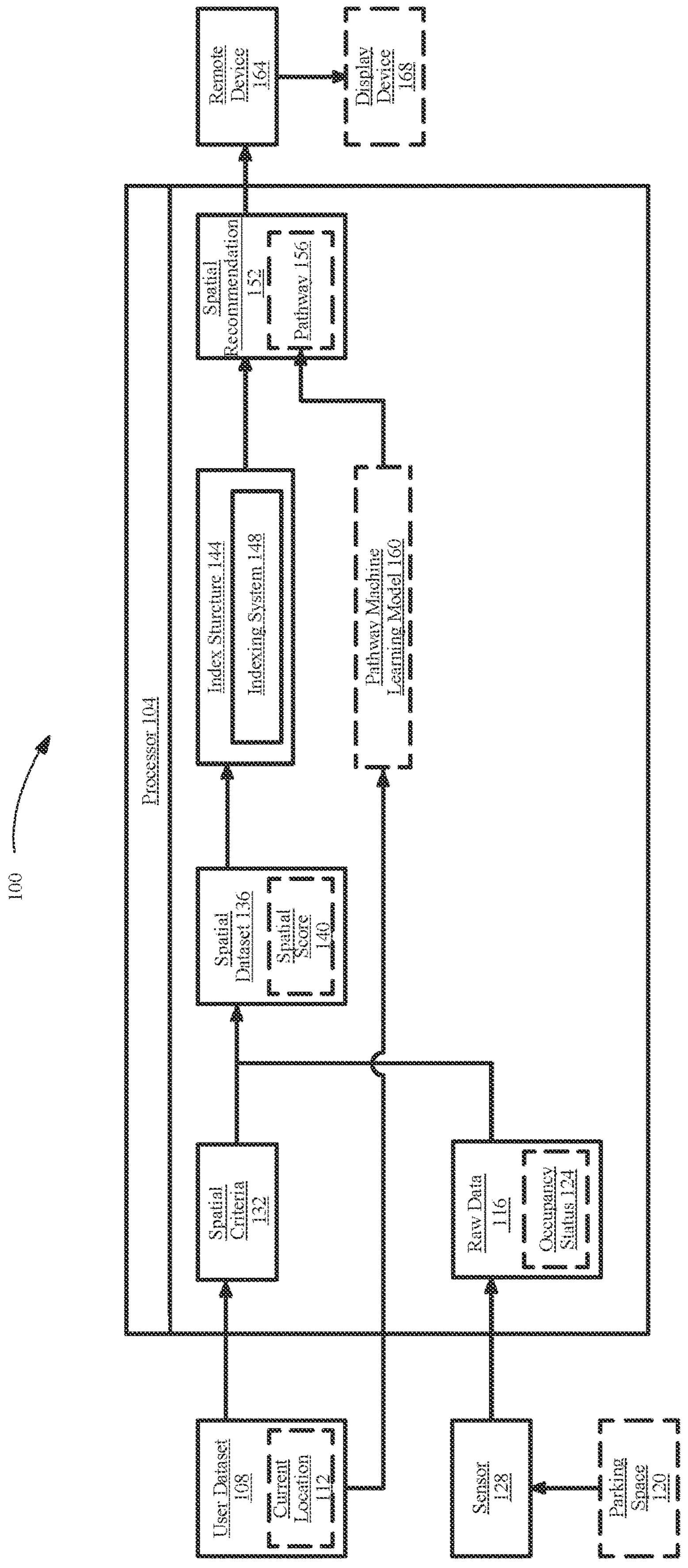
FIG. 1 is a block diagram of an exemplary embodiment of an apparatus for generating a spatial recommendation.

Referring now to FIG. 1, an exemplary embodiment of an apparatus 100 for generating a spatial recommendation is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be instructed to receive a user dataset 108. As used in the current disclosure, a "user dataset" is information that reflects a user or group of users preferences. In some cases, user dataset may include one or more parking preferences, wherein the parking preferences may include an individual's or a group's specific desires or requirements when choosing a parking space. In another embodiment, a user dataset may include one or more storage preferences, wherein storage preferences may include one or more criteria for an item to be stored. It may reflect the priorities set by the user based on various factors such as convenience, safety, cost, and additional amenities. Additionally, a user dataset 108 may include a user identifier such as a user name or identification number. A user dataset 108 can include a categorization of users. This categorization may encompass various categories such as resident, visitor, employee, management, VIP, and others. By distinguishing between these categories, the user dataset 108 may allow for a nuanced understanding of parking behaviors and preferences. Residents might prioritize long-term parking options close to their homes, while Visitors could seek short-term parking near attractions or events. Employees may need regular parking during work hours, and Management might require reserved spots. VIP categorization can highlight users who are entitled to premium parking services, such as priority locations or valet services. This classification enables targeted strategies to enhance user satisfaction and optimize parking resource management.

With continued reference to FIG. 1, a user dataset 108 may include parking preferences of users. It includes information on preferred parking locations, highlighting the areas or specific lots that users favor for reasons ranging from proximity to their destinations, cost considerations, to personal convenience. Additionally, a user dataset 108 may include the users' preferred parking space types, such as covered spaces for weather protection, outdoor spaces for easy access, or secure spaces for added safety. The dataset may also include accessibility requirements associated with the user. This may include details related to the need for ADA-compliant parking spaces or those closer to building entrances to accommodate individuals with disabilities. A user dataset 108 may include the users' charging station preference. Furthermore, the dataset may include information related to the typical duration of parking, distinguishing between the need for short-term parking for brief visits and long-term parking for extended stays or work hours. This may provide a granular view into the parking habits of users, capturing how frequently they utilize parking spaces in a given area with options such as Daily, Weekly, or Occasionally. Additionally, a user dataset 108 may include preferences for the time of day, which can range from morning, afternoon, to evening, indicating peak hours of demand and potential off-peak periods where parking availability might be higher. The dataset may also identify users' preferred days of the week for parking, distinguishing between those who primarily park on weekdays, possibly for work-related reasons, and those who park on weekends, perhaps for leisure activities.

With continued reference to FIG. 1, a user dataset 108 may include the current location 112 of the vehicle. As used in the current disclosure, a "current location" is a dynamic piece of data that provides real-time or near-real-time information about where a vehicle is situated. By tracking the current location 112 of the vehicle, processor 104 may provide can offer tailored recommendations for nearby parking options, guiding drivers to available spots that meet their preferences and requirements. In an embodiment, the current location 112 of the vehicle may be received using a GPS tracking system. This may include the GPS positioning system within a remote device such as a smart phone, tablet, laptop, desktop, smart watch, smart ring, and the like. The current location of the vehicle may also be received using GPS locators embedded within the vehicle.

With continued reference to FIG. 1, a user dataset 108 may include plurality of vehicle data. As used in the current disclosure, "vehicle data" is information associated with each vehicle associated with a user. Vehicle data may include information about the vehicle location, vehicle size, weight, make, model, vehicle identifiers, color, VIN number, and the like. The make may indicate the company that produced the vehicle (e.g., Ford, Toyota, Tesla). The model of the vehicle refers to specific model name or designation given by the manufacturer. This may help in identifying the specific type of vehicle within a brand's lineup (e.g., Ford Mustang, Toyota Camry). In some cases, vehicle data 108 may include the year that the vehicle was made.

With continued reference to FIG. 1, a user dataset 108 may include plurality of cargo data. As used in the current disclosure, "cargo data" is information associated with an item or set of items to be stored. Cargo data may play a role in optimizing the storage and handling of items. It may encompass a broad spectrum of information pertinent to each item or set of items awaiting storage. This data is not limited to the physical attributes of the cargo, such as size, weight, shape, and the like. Cargo data may also extend to specific storage needs and conditions, including whether the items are fragile, have temperature requirements, or a designated stacking limit. Furthermore, cargo data may provide a detailed description of the object(s) being stored, ensuring that each item is handled and stored in a manner that maintains its integrity and complies with safety standards.

With continued reference to FIG. 1, a user dataset 108 may be received by processor 104 through a user input. As used in the current disclosure, a "user input" refers to any information or data that a person provides to processor 104. For example, and without limitation, the user or a third party may manually input user dataset 108 using a graphical user interface of processor 104 or a remote device, such as for example, a smartphone, laptop, or tablet. User dataset 108 may additionally be generated through the answer to a series of questions. The series of questions may be implemented using a chatbot, as described herein below. A chatbot may be configured to generate questions regarding any element of the user dataset 108. In a non-limiting embodiment, a user may be prompted to input specific information or may fill out a questionnaire. In an embodiment, a graphical user interface may display a series of questions to prompt a user for information pertaining to the user dataset 108. The user dataset 108 may be transmitted to processor 104, such as via wired or wireless communication. The user dataset 108 can be retrieved from multiple third-party sources including the user's inventory records, financial records, human resource records, past user datasets 108, sales records, user notes and observations, job descriptions, and the like. A user dataset 108 may be placed through an encryption process for security purposes.

With continued reference to FIG. 1, a user dataset 108 may be generated from one or more user records. As used in the current disclosure, a "user record" is a document that contains information regarding the user. User records may include insurance cards, government records (i.e., driver's license, vehicle registration, and the like), and the like. User records may be identified using a web crawler. User records may include a variety of types of "notes" entered over time by the entity, employees of the entity, support staff, advisors, consultants, and the like. Entity records may be converted into machine-encoded text using an optical character reader (OCR).

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose the nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 may be instructed to receive a raw data 116. As used in the current disclosure, "raw data" is unprocessed information associated with a number of storage spaces. Storage spaces may include a plurality of parking spaces 120 or cargo storage spaces. As used in the current disclosure, a "parking spaces" is a designated area or spot within a parking lot, garage, or on-street parking environment that is specifically allocated for parking a vehicle. This parking spaces 120 may be marked by painted lines on the ground in outdoor lots or floors in garages and is sized to accommodate vehicles of various types, including cars, motorcycles, and in some cases, larger vehicles like buses or trucks. The raw data 116 may include the total count of parking spaces 120 available. This may include information about the specific layout of the parking facility. The raw data 116 may include a categorization of each parking space of the plurality of parking spaces 120. This categorization can encompass a variety of space types, such as those reserved for handicapped drivers, spots with electric vehicle charging stations, reserved parking spaces, spaces designated for short-term or long-term parking, covered parking spaces, uncovered parking spaces, and others.

With continued reference to FIG. 1, raw data 116 may include the spatial arrangement of plurality of parking spaces 120. This spatial arrangement is a dataset that encapsulates comprehensive information regarding the positioning and distribution of each parking space within the parking structure. This dataset might manifest as a detailed map or layout, offering a visual representation of the entire parking facility, thereby facilitating an understanding of how spaces are organized, their proximity to key facilities (i.e., elevators, restrooms, wheel chair ramps, and the like), the desired destination, ingress/egress points within the parking structure. The spatial arrangement of the plurality of parking spaces 120 may include information related to the floor the parking space in a multi-leveled parking structure, With continued reference to FIG. 1, the raw data 116 may include unique space identifier for each storage space. As used in the current disclosure, a "space identifier" is an identifier associated with a storage space. The space identifier may serve as a unique tag or reference for each individual parking spot within a facility. A space identifier may include a set of alphanumeric characters that are that are associated with each parking space 120. These identifiers may allow for precise tracking of parking space occupancy, real-time availability updates, and seamless integration with reservation and payment systems.

With continued reference to FIG. 1, the raw data 116 may include an occupancy status 124 associated each storage space. As used in the current disclosure, an "occupancy status" is an indicator of the availability of a particular parking spot. An occupancy status 124 may include indicators such as occupied, unoccupied/available, reserved, restricted, and the like. Each of these statuses may be dynamically updated based on real-time data collected from parking sensors or camera systems installed within the parking facility. This may allow for the continuous monitoring of the occupancy status 124 for each parking space 120 of the plurality of parking spaces 120. In an embodiment, an occupied status of a parking space may indicate that a vehicle is currently parked in a parking space. An available status of a parking space may indicate that the parking space is empty and can be used by a vehicle. A reserved status may indicate that the space has been prebooked and, although currently unoccupied, is not available for use by the general public. Whereas a restricted status may signify that the space is available only to a specific group of users or vehicles, such as handicapped parking, employee parking, or spots with electric vehicle charging stations. In an embodiment, occupancy status 124 may be reflected in a binary manner. For example, an occupied parking space may be represented as "1," whereas an unoccupied parking space may be represented as "0."

With continued reference to FIG. 1, the occupancy status 124 of each parking space 120 may be generated using one or more sensors 128. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, the presence or absence of a vehicle within a parking space 120. Sensor 128 may be used to detect an occupancy status 124 of each parking space 120. In one or more embodiments, and without limitation, sensor 128 may include a plurality of sensors. In one or more embodiments, and without limitation, sensor 128 may include an optical or image sensor such as a camera, a CMOS detector, a CCD detector, a video camera, a thermal and/or infrared camera, motion sensors, pressure sensors, level sensors, imaging devices, imaging sensors, and the like. Sensor 128 may be a contact or a non-contact sensor. Signals may include electrical, electromagnetic, visual, audio, radio waves, or another undisclosed signal type alone or in combination. Sensor 128 may include a plurality of independent sensors, where any number of the described sensors may be used to detect any number of physical or electrical quantities associated with each parking space 120. The sensor 128 may be the same or substantially similar to the sensors disclosed in U.S. Non-provisional patent application Ser. No. 18/615,676, filed on Mar. 25, 2024, and titled "SYSTEM AND METHOD FOR MANAGING SPATIAL DATA," which is incorporated by reference herein in its entirety.

Still referring to FIG. 1, sensor 128 may additionally include at least a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image.

With continued reference to FIG. 1, processor 104 may be instructed to generate one or more spatial criteria 132 as a function of the user dataset 108. As used in the current disclosure, a "spatial criterion" is a represents a tailored set of requirements for a favorable storage space. These criteria may be derived by analyzing user dataset 108, which may include past parking behavior, explicitly stated preferences, and inferred preferences based on user interactions with a parking management system. The user dataset 108 may be analyzed to identify patterns, preferences, and unique user requirements. This analysis might involve detecting subtle preferences or clustering users into segments with similar parking behavior and needs, as discussed in greater detail herein below. Analyzing the user dataset 108 may involve distilling complex patterns of user behavior and preferences into a coherent set of guidelines that parking systems can use to match users with ideal parking spots. These criteria may consider a wide array of factors, including but not limited to, the desired proximity to destinations, budget constraints, and specific amenities like handicap access or electric vehicle charging stations. In one embodiment, as users interact with the parking system, cither by providing feedback, cither explicitly through ratings and reviews or implicitly through their parking choices, the spatial criteria 132 may be iteratively updated. Processor 104 may recalibrate the criteria based on this feedback, ensuring that the recommendations not only meet the current needs of users but also anticipate their future preferences. Spatial criteria 132 may include a user's preferences for parking spaces close to specific destinations like entrances, elevators, or destinations (e.g., shops, offices). Spatial criteria 132 may include a user's preference for a category of parking space. This may encompass various categories such as resident, visitor, employee, management, VIP, covered vs. uncovered parking, EV charging spots, handicapped accessible spaces, secure parking areas, and the like. In an embodiment, spatial criteria 132 may include the user price sensitivity for parking. This may include preferences related to parking fees, with some users preferring more economical options while others may prioritize convenience over cost. In an additional embodiment, the spatial criteria 132 may include the user's preferences for short-term vs. long-term parking, or for parking during specific times of the day.

With continued reference to FIG. 1, processor 104 is configured to generate a spatial dataset 136 by organizing the raw data 116 as a function of the user dataset 108. As used in the current disclosure, a "spatial dataset" is a structured collection of data that describes a relationship or connection that exists between two types of data. Spatial datasets 136 may describe the relationship between the raw data 116 and the user dataset 108. Processor 104 may integrate both the raw data 116 and the user dataset 108 into the spatial dataset 136. This may include merging or linking data from both datasets to create a unified view of parking availability as compared to spatial criteria 132. This might involve matching spatial criteria 132 with available parking spaces that meet those criteria. A spatial dataset 136 may include an identification of common variables or factors that can be used to link the two datasets. In some cases, a raw data 116 may contain information or values that identify the quantity and location of available parking spots. Raw data 116 may include unprocessed information about parking spaces, including their current occupancy status, geographical location, and specific characteristics such as whether they are covered, have electric vehicle (EV) charging capabilities, or are accessible for disabled users. This data is continuously updated to reflect real-time changes in parking space availability. Whereas the spatial criteria 132 may include information related to the preferences of the user for those parking spots. Creating a relationship between each of the datasets may include identifying commonalities between the datasets. This may include determining which parking spaces best fit the preferences of the user. The user dataset 108 may be more than a collection of data points but a dynamic, interconnected web of information that bridges the gap between the supply of parking spaces and the demand generated by users. The spatial dataset 136 may be the same or substantially similar to the spatial dataset mentioned in U.S. Non-provisional patent application Ser. No. 18/615,676, filed on Mar. 25, 2024, and titled "SYSTEM AND METHOD FOR MANAGING SPATIAL DATA," which is incorporated by reference herein in its entirety.

With continued reference to FIG. 1, processor 104 may reorganize the raw data 116 as a function of the user dataset 108 and/or the spatial criteria 132. Reorganizing the raw data 116 may involve manipulating the raw data to uncover and accentuate underlying patterns and relationships that align with user requirements and parking standards. Organizing the raw data may include identifying key relationships between the user dataset 108 and the spatial criteria 132, which may involve discerning various variables within the user dataset. These variables could range from dependent and independent factors to other pertinent attributes that significantly influence parking preferences and decisions. In instances where the direct associations between datasets are not immediately clear, the processor 104 identify new or derivative variables. Such variables offer a more accurate representation of the data's interconnectedness, possibly through the calculation of ratios, the aggregation of disparate data points, or the strategic categorization of variables, thereby streamlining the analysis. The approach to reorganizing the data may be highly dependent on the specific characteristics of the user dataset 108 and the raw data 116. To this end, the processor (104) may employ various data transformation techniques to enhance the interpretability of the relationships between datasets. Techniques such as logarithmic transformations, standardization, or normalization are commonly leveraged to facilitate a clearer understanding of these associations. Moreover, the reorganization process might include the selective filtering or segmentation of the data, concentrating on particular subsets that bear significant relevance to the identified spatial criteria 132.

With continued reference to FIG. 1, organizing raw data 116 may be valuable when generating a spatial dataset 136. In an embodiment, organizing raw data 116 may include sorting parking spaces into categories based on various attributes. These attributes can include whether the space is covered or uncovered, the availability of specific amenities like electric vehicle (EV) charging stations or handicapped accessibility, and the presence of security features. This categorization process may be to filter and find parking spaces that meet spatial criteria 132. In a non-limiting example, an individual with mobility issues might prioritize finding handicapped accessible parking spots, while another might look for spots with EV charging facilities. In an additional embodiment, organizing raw data 116 may include assigning each parking space a precise geolocation tag that corresponds to the space identifier. This may enable the system to show users parking spaces in their desired location or proximity to their final destination. This geolocation tagging may help in streamlining the search process, making it more efficient for users to find suitable parking without unnecessary hassle. It may also facilitate navigation to the parking spot through integration with mapping and GPS technologies. The occupancy status of each parking space may be monitored and updated in real-time. This feature may provide processor 104 with up-to-date information about the availability of parking spaces. By knowing the current occupancy status, the processor 104 can make informed decisions and avoid areas with no available spots.

With continued reference to FIG. 1, organizing raw data 116 may include generating spatial score 140 for each parking space of a plurality of parking spaces as a function of a comparison of the raw data 116 to the one or more spatial criteria 132. As used in the current disclosure, a "spatial score" is a quantitative metric that evaluates the how well a given parking space matches a spatial criterion. This score may be derived from analyzing the patterns, correlations, or connections that exist between two or more datasets (i.e., the raw data 116 and spatial criteria 132.) This score may be a numerical value that quantifies the degree of match between a given parking space to the spatial criteria 132. This may involve analyzing the extent to which each parking space meets the criteria. The outcome of this comparison may be a numerical value that quantifies the degree of match between the parking spaces attributes (i.e., location, availability, categorization, and the like) and the specified criteria. This score could potentially range from a low value, indicating a poor match, to a high value, denoting an excellent fit with the user's needs. The calculation of the spatial score may leverage statistical and computational techniques to identify patterns, correlations, or connections between the parking data and the criteria. For example, machine learning algorithms could be employed to weigh different attributes of the parking spaces and evaluate them against the criteria in a nuanced manner.

With continued reference to FIG. 1, the spatial score 140 may be normalized or standardized to ensure comparability across different datasets or variables. This means that the score is often scaled to fall within a specific range (i.e., 0 to 1 or −1 to 1). Normalization techniques can include min-max scaling, z-score normalization, or logarithmic transformation. In an embodiment, a spatial score 140 may be expressed as a numerical score, a linguistic value, or an alphanumeric score. A non-limiting example, of a numerical score, may include a scale from 1-10, 1-100, 1-1000, and the like. In another non-limiting example, linguistic values may include, "Strong Match," "Moderate Match," "Weak Match," and the like. In some embodiments, linguistic values may correspond to a numerical score range.

With continued reference to FIG. 1, processor 104 may generate a spatial score 140 using a score machine-learning model. As used in the current disclosure, a "score machine-learning model" is a machine-learning model that is configured to generate spatial score 140. Score machine-learning model may be consistent with the machine-learning model described below in FIG. 2. In an embodiment, a score machine learning model may include a classifier. The classifier may be configured to classify parking spaces to one or more spatial criteria. Inputs to the score machine-learning model may include user datasets 108, raw data 116, spatial criteria 132, occupancy status 124, examples of spatial score 140, and the like. Outputs to the score machine-learning model may include a spatial score 140 tailored to a comparison of the spatial criteria 132 and raw data 116. Score training data may include a plurality of data entries containing a plurality of inputs that are correlated to a plurality of outputs for training a processor by a machine-learning process. In an embodiment, score training data may include examples of spatial criteria 132 correlated to examples of raw data 116. Score training data may be received from database 300. Score training data may contain information about user datasets 108, raw data 116, spatial criteria 132, occupancy status 124, examples of spatial score 140, and the like. In an embodiment, Score training data may be iteratively updated as a function of the input and output results of past score machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, score machine-learning model may be configured to compare the raw data 116 to the one or more spatial criteria 132 using a fuzzy matching process. As used in the current disclosure, a "fuzzy matching process" is a technique used in data analysis and information retrieval to compare and match strings or data points that are not an exact match but are similar or closely related. Processor 104 may be configured to choose a fuzzy matching algorithm or method based on the specific requirements and the level of similarity that is desired. Fuzzy matching algorithms may include Levenshtein distance, Jaccard Similarity, Cosine Similarity, Soundex and Metaphone, and the like. Processor 104 may be configured to determine a similarity threshold that defines what level of similarity that is desired to match raw data 116 to one or more spatial criteria 132. The threshold can be set based on the trade-off between precision and recall. The processor 104 may set a similarity threshold to define the level of similarity required to match raw data 116 to one or more spatial criteria 132. This threshold may determine how strict or lenient the matching should be. A lower threshold results in more matches (higher recall) but potentially less accuracy, while a higher threshold ensures more precise matches (higher precision) but may miss some relevant matches. In an embodiment, raw data 116 and one or more spatial criteria 132 may each be represented as a fuzzy set. In fuzzy set theory, data points can have degrees of membership rather than a binary state (completely in or out of a set), which suits the concept of "partial matching" inherent in fuzzy matching. In the current case, score machine-learning model may attempt to quantify the level of a partial matching between raw data 116 and one or more spatial criteria 132 to identify spatial score 140. Processor 104 may compare each fuzzy set and identify a spatial score 140 as a function of the comparison. In some cases, processor a similarity score for each pair of fuzzy sets. This score may quantify the degree of similarity between the fuzzy sets.

With continued reference to FIG. 1, organizing raw data 116 may include identifying one or more spatial clusters as a function of the spatial criteria 132. As used herein, a "spatial cluster" is a collection of data points that have been grouped together based on their proximity to one another. A spatial cluster may include a plurality of spatial scores that have been plotted along one or more continuums. In some embodiments, a spatial cluster may reflect a spatial criterion 132. A spatial cluster 132 may be a subset within the larger dataset where each member (or data point) bears a resemblance or proximity to others within the same cluster, thus enabling a differentiated analysis from other clusters. The clustering process highlights the inherent structure within the data, showcasing patterns, relationships, or commonalities that might not be apparent at first glance. Identification of clusters may be used to uncover patterns, structure, or relationships within a dataset, such as a user dataset 108 and a raw data 116. In practical terms, spatial clusters can be shaped by a variety of criteria, such as geographic proximity, type of parking (e.g., covered, uncovered, with EV charging facilities), availability, or even price range. For instance, a cluster may emerge around a popular destination, indicating a high demand for parking spaces within walking distance. Alternatively, another cluster might form based on user preference for parking spaces with electric vehicle charging stations, reflecting the growing trend towards sustainable transportation. By examining the clusters, processor 104 can discern patterns in parking behavior or preferences. Parking lusters allow for more personalized spatial recommendations, as they reflect the nuanced preferences of different user segments.

With continued reference to FIG. 1, processor 104 may identify one or more spatial clusters using hierarchical clustering. As used in the current disclosure, "hierarchical clustering" is a method that arranges data points into a tree-like structure where clusters at various levels of granularity are formed. To generate hierarchical clustering processor 104 may choose one or more similarity or distance metrics to quantify the similarity between data points of raw data 116. Distance metrics may include Euclidean distance, Manhattan distance, or correlation coefficients. This metric may be crucial for hierarchical clustering to determine which data points are similar to each other. Processor 104 may apply one or more hierarchical clustering algorithms to the raw data 116. This may be done using an agglomerative approach (bottom-up) and/or a divisive approach (top-down). Agglomerative clustering may start with individual data points as separate clusters and progressively merges them into larger clusters, while divisive clustering may star with all data points in a single cluster and recursively divides them into smaller clusters. As the clustering algorithm is implemented it may construct a tree data structure. As used in the current disclosure, a "tree data structure" is a visual and analytical tool used to illustrate how individual elements in a dataset are grouped together based on their similarity. In this structure, each leaf (or node) may represent an individual data point of raw data 116. At some points on the tree, nodes may begin to merge, indicating the formation of clusters. These mergers may be based on a chosen similarity or distance metric, such as Euclidean distance for quantitative data or Jaccard similarity for categorical data. The height, on the data tree structure, at which two nodes merge may represent the distance or dissimilarity between them, with lower mergers indicating greater similarity. This hierarchical approach may allow for a visual representation of which elements are grouped together but also the hierarchy and multi-level relationships within the data.

With continued reference to FIG. 1, a tree data structure may include one or more balancing tree structures (i.e., B+ Tree structures and B-Tree structures), B-trees may be referred to as self-balancing tree structures that adapt to insertions and deletions of data, making them well-suited for dynamic indexing scenarios. As new raw data 116 is added to the dataset or existing data is removed, the B-tree index may be updated accordingly. B-trees may be designed to handle insertions and deletions efficiently while maintaining balance, which ensures predictable and consistent search performance. B-trees may be configured to automatically balance themselves during insertions and deletions to maintain a relatively uniform tree structure. This self-balancing property may guarantee that the height of the tree remains logarithmic, optimizing search and retrieval operations. When a node in the B-tree becomes full due to insertions, it may split into two or more nodes, and the parent node is updated accordingly. Conversely, when a node becomes too sparse due to deletions, it may merge with a neighboring node to maintain balance. In an embodiment, a B-tree index may be configured to dynamically adapt to the changing dataset without requiring a complete rebuild of the index. This adaptability is particularly valuable in scenarios where data is frequently updated or appended.

With continued reference to FIG. 1, processor 104 may identify one or more spatial clusters using a cluster machine-learning model. As used in the current disclosure, a "cluster machine-learning model" is a machine-learning model that is configured to generate one or more spatial clusters. A cluster machine-learning model may be consistent with the machine-learning model described below in FIG. 2. Inputs to the cluster machine-learning model may include raw data 116, user datasets 108, spatial criteria 132, occupancy status 124, spatial scores 140, examples of or more spatial clusters, and the like. Outputs to the cluster machine-learning model may include or more spatial clusters tailored to the raw data 116 and the spatial criteria 132. Cluster training data may include a plurality of data entries containing a plurality of inputs that are correlated to a plurality of outputs for training a processor by a machine-learning process. In an embodiment, cluster training data may include a plurality of raw data 116 and the spatial criteria 132 correlated to examples of or more spatial clusters. Cluster training data may be received from database 300. Cluster training data may contain information about raw data 116, user datasets 108, spatial criteria 132, occupancy status 124, spatial scores 140, examples of or more spatial clusters, and the like. In an embodiment, cluster training data may be iteratively updated as a function of the input and output results of past cluster machine-learning model or any other machine-learning model mentioned throughout this disclosure.

With continued reference to FIG. 1, processor 104 may generate a spatial report as a function of the spatial dataset 136. As used in the current disclosure, a "spatial report" is a report that analyzes storage or parking usage patterns within a facility. This report may provide an understanding of how storage spaces and/or parking spaces are utilized. This may include an identification of peak usage times and optimization parking/storage allocation and management strategies. In an embodiment, the spatial report may provide a detailed overview of the occupancy status of all parking/storage spaces within the facility, categorized by type (e.g., short-term, long-term, VIP, EV charging stations) and location (e.g., level or zone) over a given period of time. It may visually represent this data using color-coded maps or charts, making it easy to identify areas of high and low occupancy at a glance. In an embodiment, in multi-level parking facilities, the report may include a level-by-level breakdown of occupancy rates, highlighting which floors tend to fill up first and which ones remain underutilized. This can help in directing incoming vehicles to less crowded levels to balance the usage across the facility. In a second embodiment, the spatial report may analyze the frequency and duration of parking/storage within the facility. This may include the identification of patterns such as the average stay length and the recurrence of visits by the same vehicles. Another component of the spatial report may be the identification of peak usage times. This may pinpoint the times of day, week, month, and year when the parking facility experiences the highest and lowest occupancy. This temporal analysis may be used to guide dynamic pricing strategies and targeted marketing of parking services. In some cases, based on the insights derived from the parking dataset, the spatial report may offer recommendations for optimizing parking space allocation. This may involve reallocating spaces between different types of parking (e.g., converting underutilized VIP spaces into additional EV charging spots), implementing dynamic pricing to manage demand, or enhancing signage and wayfinding to guide drivers to less crowded areas.

With continued reference to FIG. 1, the processor may generate the spatial report by first aggregating and analyzing data collected from various sources within the parking/storage facility. This may include sensors associated with parking/storage spaces, ticketing systems, and user feedback. This data may encompass occupancy rates, duration of parking, user preferences, and patterns of usage across different times and days. The processor may apply algorithms to sift through this data, identifying trends and patterns that may reveal insights about parking space utilization, such as peak occupancy times, the most sought-after parking zones, and periods of low usage. The processor 104 may then cross-references this information with external factors, including event schedules at or near the facility, seasonal variations, and any planned construction or maintenance activities that might impact parking availability. The spatial report may be structured to highlight key findings through visual aids like heat maps for occupancy, graphs depicting usage trends over time, and diagrams showing the distribution of different types of parking spaces (e.g., EV charging, disabled access). The spatial report may also integrate predictive analytics to forecast future parking demands based on historical data and identified trends, offering recommendations for optimizing parking space allocation and management. For instance, it might suggest adjustments to pricing during peak times to manage demand, reallocating spaces to different user groups based on usage patterns or enhancing signage and wayfinding to improve traffic flow within the facility.

With continued reference to FIG. 1, processor 104 is configured to store the reorganized spatial dataset 136 in an index structure 144. As used in the current disclosure, an "index structure" is a data structure or mechanism used to optimize and accelerate the retrieval of specific information or records from a dataset. An index structure 144 may be used to store and organize data a plurality of data points associated with the spatial dataset 136. An index structure 144 may organize data points associated with the spatial dataset 136 by creating a systematic and searchable framework that enhances the efficiency and speed of data retrieval. When applied to the spatial dataset 136, the index structure 144 may categorize and sort data points based on key attributes or fields, such as occupancy status 124, spatial criteria 132, spatial clusters, and the like. This categorization may involve mapping each data point to an index key, which is then stored in a structured format like a single column index, unique index, hash index, bitmap index, B-tree, hash table, and/or bitmap index. These structures may enable quick lookups, as they reduce the need to scan through the entire dataset to find a particular piece of information. Instead, the index directs the query to the precise location where the relevant data is stored. This organization is especially beneficial in large datasets, where it significantly cuts down on search time and improves overall data handling efficiency. In a non-limiting example, a B-tree index may organize data in a balanced tree structure, allowing for efficient retrieval, insertion, and deletion of data points. Alternatively, a hash table may use a hash function to map keys to specific positions in a table, facilitating rapid data access through direct indexing. By organizing data points in such structured ways, index structures significantly reduce the time complexity of search operations, making data retrieval in large databases fast and efficient. By efficiently indexing the spatial dataset 136, the system ensures that even as the volume of data scales up, the time taken to access any specific piece of data remains relatively constant and manageable. An index structure 144 may establish a relationship between the indexed data and the associated records in the dataset. It maps key values or attributes to the corresponding data entries. This may include recording and/or highlighting the relationships between the raw data 116 and the spatial criteria 132. Index structures are typically built on one or more key values or attributes that are commonly used for searching, filtering, or sorting data. These key values serve as references to the actual data records. In an embodiment, an index structure 144 may be a database such as database 300.

With continued reference to FIG. 1, processor 104 is configured to store the spatial dataset 136 in an index structure 144 by implementing an indexing system 148. As used in the current disclosure, an "indexing system" is a structured and organized approach to categorizing, cataloging, and managing information or resources for efficient retrieval and reference. An indexing system 148 may be used to facilitate quick and effective access to specific items, documents, data, or resources within a larger collection. An indexing system 148 may be used to classify data points within spatial datasets 136 into one or more categories based on the specific spatial criteria 132. This may include organizing the data points within spatial datasets 136 into categories, topics, or classes to create a structured hierarchy. Indexing systems 148 may rely on key attributes, metadata, or descriptors associated with data points within spatial datasets 136 to facilitate the organization, refinement, and indexing of the spatial datasets 136. These attributes may include parking space availability, parking space locations, parking space attributes (i.e., location, availability, categorization, and the like), parking space reservations, parking space price points, and other relevant information that help define and categorize the items. In an embodiment, an indexing system 148 may assign keywords or terms to data points to represent their content or characteristics. These keywords serve as access points and enable users to search for and locate items based on specific terms. In a non-limiting example, one or more spatial clusters may be labeled with one or more keywords to aid in the identification and interpretation of the spatial cluster 132. In an embodiment, an indexing system 148 may use a hierarchical structure, such as a taxonomy or tree-like classification, to arrange items into broader categories and subcategories. This structure may provide a systematic way to navigate the indexed content. This hierarchical structure may be used to store one or more hierarchical spatial clusters. For example, an indexing system 148 may be configured to index each spatial cluster 132 according to its position in the tree data structure.

With continued reference to FIG. 1, an indexing system 148 may be configured to store data points associated with spatial dataset 136. Indexing system 148 may operate by creating a structured framework that can effectively map the relationships and interactions between datasets. Initially, the indexing system may combine the datasets (i.e., the raw data 116 and spatial criteria 132). This may include preprocessing data points associated with spatial dataset 136. This may involve cleaning the data, handling missing values, normalizing datasets, and possibly transforming data into a format suitable for analysis and indexing. Indexing system 148 may identify key attributes or features within both datasets that will be used for indexing.

With continued reference to FIG. 1, the indexing system 148 may build an index structure 144 that maps these relationships described within the spatial dataset 136. This structure could be a multidimensional index where one dimension represents spatial criterions 132 and another represents raw data 132, and the associations are reflected in the way the data points are arranged or linked within this space. The index structure 144 might use tree-based structures like B-trees or R-trees, especially if the data is multidimensional. In some cases, graph databases can be employed to represent complex relationships more flexibly. As new raw data 116 is ingested into the system, the indexing system 148 may dynamically update the index structure 144 to reflect new associations or changes in existing ones. This may be crucial in maintaining the relevance and accuracy of the index, especially given the variable nature of the raw data 116. The indexing system may allow for efficient query processing. Users can query the index to find spatial recommendations.

With continued reference to FIG. 1, the indexing system 148 is configured to dynamically adjust the index structure in response to additional raw data 116. This may be done by implementing adaptive indexing strategies. This dynamic adjustment may be done to ensure that the index remains efficient and effective as the dataset grows and evolves. The indexing system 148 may be configured to continuously monitor the spatial dataset 136 for new raw data 116. In a non-limiting example, new raw data 116 may include information related to changes in the availability of storage spaces. This may include information about changes in the occupancy status of each storage space and/or parking space. In an additional embodiment, new raw data may include information about changes in the overall availability of storage spaces and/or parking spaces. For example, the availability of storage spaces and/or parking spaces may change according to the day of the week or events that are being held nearby. This may include tracking changes in the dataset's characteristics, size, distribution, and the like. As new data points are added to the spatial dataset 136, processor 104 may define thresholds or triggers that indicate when it is time to update the index structure. These thresholds can be based on factors like data volume, query performance, changes in data patterns, and the like. Processor 104 may additionally implement auto-scaling mechanisms that automatically adjust the index structure as needed. This may involve increasing the index size, adding new index entries, or reorganizing the index hierarchy. In an embodiment, if the dataset becomes too large to manage efficiently, the indexing system 148 may dynamically partition of the index structure 144. Partitioning the index structure 144 may include splitting the index structure 144 into smaller partitions or shards, each handling a subset of the data. This allows for parallel processing and faster query performance. In some cases, the indexing system 148 may be configured to analyze the distribution of data and adapt the index structure to optimize data retrieval. For example, if certain data values are heavily skewed, you may create specialized indexes or partitions for those values. The dynamic adjustment of the index structure 144 may be implemented using adaptive indexing algorithms that can modify the index structure on-the-fly. Examples include self-balancing tree structures (e.g., B-trees), which adjust as new data is inserted or removed. Dynamic indexing of raw data 116 may involve the use of B-tree data structures to efficiently manage and search through a continually changing dataset.

With continued reference to FIG. 1, the processor 104 is instructed to determine a spatial recommendation 152 by querying the index structure 144 as a function of the user dataset. As used in the current disclosure, a "spatial recommendation" is a personalized suggestion provided to a user about where to park their vehicle. A spatial recommendation may be based on a combination of their individual preferences, historical parking behavior, and real-time availability of parking spaces. These recommendations may be generated by analyzing a vast array of data within a parking management system, including the user's past parking patterns, their stated preferences (such as proximity to a destination, cost sensitivity, or desired amenities like electric vehicle charging stations), and the current status of parking spaces (occupied, available, reserved, etc.). A spatial recommendation 152 may include a selection of a parking spot from a plurality of parking spots. This may include providing the user with the space identifier associated with the selected parking spot. In an embodiment, a spatial recommendation 152 may include an estimated time it will take to walk from the selected parking spot to the user's final destination. This is particularly useful in large parking complexes or urban areas where parking spots might be a significant distance from the destination. Additionally, a spatial recommendation 152 may include a description of the availability of accessible parking options for users with disabilities, including information on elevator access, ramp locations, or the proximity to accessible entrances. For electric vehicle owners, spatial recommendation 152 may include an indication of whether the recommended parking spot has EV charging capabilities, including the type of charger, availability, and charging rates. A spatial recommendation 152 may include information on the size of the parking spot, which can be crucial for users with larger vehicles or those requiring extra space. In an additional embodiment, a spatial recommendation 152 may include an option to reserve and pay for the parking spot in advance, ensuring that the space is available upon arrival.

With continued reference to FIG. 1, a spatial recommendation 152 may be generated by querying the index structure 144. Querying the index structure 144 may describe the process of accessing and retrieving specific information from a structured database or dataset. The index structure 144 may serve as a roadmap to efficiently locate desired data. When a user or system queries this index structure, it quickly navigates through the organized data to find and retrieve information that matches the query criteria. This could involve searching for available parking spaces that meet certain user-defined criteria or preferences. Alternatively, the query may include simply requesting a parking space.

With continued reference to FIG. 1, processor 104 may determine a spatial recommendation 152 using a recommendation machine-learning model. As used in the current disclosure, a "recommendation machine-learning model" is a machine-learning model that is configured to determine spatial recommendation 152. Recommendation machine-learning model may be consistent with the machine-learning model described below in FIG. 2. Inputs to the recommendation machine-learning model may include raw data 116, user datasets 108, spatial criteria 132, occupancy status 124, spatial scores 140, spatial clusters, current location 112, spatial recommendations 152, examples of spatial recommendation 152, and the like. Outputs to the recommendation machine-learning model may include spatial recommendation 152 tailored to the spatial dataset 136. Recommendation training data may include a plurality of data entries containing a plurality of inputs that are correlated to a plurality of outputs for training a processor by a machine-learning process. In an embodiment, recommendation training data may include a plurality of spatial dataset 136 correlated to examples of spatial recommendation 152. Recommendation training data may be received from database 300. Recommendation training data may contain information about raw data 116, user datasets 108, spatial criteria 132, occupancy status 124, spatial scores 140, spatial clusters, current location 112, spatial recommendations 152, examples of spatial recommendation 152, and the like. In an embodiment, recommendation training data may be iteratively updated as a function of the input and output results of past recommendation machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, the spatial recommendation 152 may include a pathway 156 from the at least a current location 112 to at least one parking space of a plurality of parking spaces 120. As used in the current disclosure, a "pathway" refers to a delineated route or series of directions that guide a user from their current location to a designated storage space within a storage facility or area. This may include an identification of a pathway 156 from a current location of a user to at least one parking space 120 within a parking facility. Alternatively, a pathway 156 may include directions from a current location of a piece of cargo to at least one storage space within a storage facility. This pathway 156 may be designed to offer the most efficient and straightforward route possible, taking into account various factors such as traffic conditions, road closures, pedestrian zones, and the specific layout of the parking facility. A pathway 156 may be beneficial in complex urban environments, large parking lots, or multi-level parking structures where finding a parking space can often be challenging. A pathway 156 may include a starting point (the current location 112) and an end point (the selected parking space). The pathway 156 may include a set instructions for each turn or decision point along the route, potentially including visual aids like maps or symbols. The instructions may be given through multi-modal communications. This may include verbal modalities, visual modalities (i.e., Maps and Symbols), haptic modalities, and the like. Processor 104 may make adjustments to the pathway in real-time based on changing conditions, such as traffic congestion or road closures, to ensure the user is always on the most efficient route. This pathway 156 may include a navigational route that includes interactive maps that not only provide a comprehensive view of the route but also highlight landmarks and clearly mark pedestrian and vehicular paths.

With continued reference to FIG. 1, to identify a pathway 156 a processor 104 may gather data, pinpointing the user's current location using GPS technology, assessing the real-time availability and geographical positions of parking spaces, and integrating specific user preferences such as the need for covered spaces or electric vehicle charging points. Additionally, it considers environmental factors, including current traffic flows, road closures, and pedestrian zones, to construct a comprehensive data landscape. Upon collecting this data, the processor may scrutinize traffic conditions to identify routes free from congestion, performs spatial analysis to map out the most direct and accessible paths, and filters parking options to align with the user's stated preferences. The culmination of this analysis may be the strategic calculation of the optimal pathway 156. The pathway may be laid out on a digital map 156, with clear markers delineating the route, accompanied by detailed, step-by-step navigational instructions. This presentation is dynamic, offering real-time updates on route conditions, adjustments to the ETA, and notifications about the parking space's status, ensuring the user is continually informed from departure to arrival.

With continued reference to FIG. 1, processor 104 may optimize pathway 156 to create the most efficient route between the start point and the end point. This may involve evaluating various factors like real-time traffic conditions, road closures, and user preferences to calculate the most efficient route to a designated parking space. This optimization process may include leveraging algorithms that account for both distance and estimated travel time, adjusting dynamically to changes in traffic patterns or parking space availability. The optimization may aim to minimize travel time, reduce fuel consumption, and ensure user convenience by considering direct routes, avoiding congested areas, and aligning with the user's specific parking preferences. This streamlined methodology may ensure that the recommended pathway is not only the most practical given the current conditions but also customized to meet the individual needs of the user, thereby enhancing the overall parking experience.

With continued reference to FIG. 1, processor 104 may generate a pathway 156 using a pathway machine-learning model 160. As used in the current disclosure, a "pathway machine-learning model" is a machine-learning model that is configured to generate pathway 156. Pathway machine-learning model 160 may be consistent with the machine-learning model described below in FIG. 2. Inputs to the pathway machine-learning model 160 may include raw data 116, user datasets 108, spatial criteria 132, occupancy status 124, spatial scores 140, spatial clusters, current location 112, spatial recommendations 152, examples of pathways 156, and the like. Outputs to the pathway machine-learning model 160 may include pathways 156 tailored to the spatial recommendation 152 and the current location 112. Pathway training data may include a plurality of data entries containing a plurality of inputs that are correlated to a plurality of outputs for training a processor by a machine-learning process. In an embodiment, pathway training data may include a plurality of spatial recommendation 152 and current locations 120 correlated to examples of pathways 156. Pathway training data may be received from database 300. Pathway training data may contain information about raw data 116, user datasets 108, spatial criteria 132, occupancy status 124, spatial scores 140, spatial clusters, current location 112, spatial recommendations 152, examples of pathways 156, and the like. In an embodiment, pathway training data may be iteratively updated as a function of the input and output results of past pathway machine-learning model 160 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, machine-learning models and/or classifiers may be trained using past inputs and outputs of pathway machine-learning model 160. In some embodiments, if user feedback indicates that an output of machine-learning models and/or classifiers was "bad," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for the machine-learning model and/or classifier using user feedback. For the purposes of this disclosure, “accuracy score,” is a numerical value concerning the accuracy of a machine-learning model. For example, the accuracy/quality of the output of the pathway machine-learning model 160 may be averaged to determine an accuracy score. In some embodiments, an accuracy score may be determined for accuracy of the pathway 156. Accuracy score or another score as described above may indicate a degree of retraining needed for a machine-learning model and/or classifier. Processor 104 may perform a larger number of retraining cycles for a higher number (or lower number, depending on a numerical interpretation used), and/or may collect more training data for such retraining. The discussion within this paragraph and the paragraphs preceding this paragraph may apply to both the pathway machine-learning model 160 and/or any other machine-learning model/classifier mentioned herein.

With continued reference to FIG. 1, processor 104 may be instructed to transmit the spatial recommendation 152 to a remote device 164. Transmitting the spatial recommendation 152 to a remote device 164 may involve sending the spatial recommendation 152 from the parking management system's server or cloud infrastructure to the remote device 164. As used int the current disclosure, a “remote device” is a personal device that is associated with the user. A remote device 164 may include a smartphone, laptop, smart watch, smart ring, tablet, in-car navigation system, or other in-car computing devices. The transmission typically may occur over a network connection, leveraging standard communication protocols such as HTTP(S) for web-based applications or Bluetooth for in-car systems. In an embodiment, upon receiving the data, the remote device 164 may process and displays the spatial recommendation 152. Displaying the spatial recommendation 152 may include an integration with the remote device's 164 native mapping and navigation tools to offer a seamless transition from recommendation to route navigation. This might include visual maps, step-by-step directions, and the option to accept the recommendation and start navigation with a single tap or voice command.

With continued reference to FIG. 1, processor 104 may be instructed to transmit the spatial recommendation 152 to a remote device 164 using a message queuing telemetry transport (MQTT). As used in the current disclosure, “message queuing telemetry transport” is a lightweight, publish-subscribe network protocol that enables devices to communicate and exchange messages over the internet. MQTT may be used in situations where a small code footprint is required, or network bandwidth is limited. In an embodiment, MQTT may be used for connecting remote devices with a minimal network bandwidth requirement. In an embodiment, a central broker may manage the message flow between devices. Devices may subscribe to specific topics through the broker and receive messages published to those topics. This may decouple the producers and consumers of messages, allowing for scalable and flexible communication architectures. To transmit a spatial recommendation 152 using MQTT, the parking management system may publish the recommendation to a specific topic on an MQTT broker. Each remote device 164 that requires the spatial recommendation 152 may subscribe to this topic. When the system publishes the spatial recommendation 152, the MQTT broker may ensure the message is delivered to all subscribed devices, utilizing the chosen Quality of Service (QOS) level to manage the delivery guarantees. This method may allow for efficient, real-time distribution of spatial recommendations to a wide range of devices, ensuring users receive timely and relevant parking information.

Still referring to FIG. 1, processor 104 may be configured to display the index structure 144 using a display device 168. As used in the current disclosure, a “display device” is a device that is used to display a plurality of data and other digital content. In an embodiment, a display device 168 may be located within a vehicle associated with the user. The display device may include an infotainment system and/or digital dashboard of a vehicle. Processor 104 may be configured to generate a display data structure, wherein the display data structure may be configured to cause a display device to display the target report or other data mentioned herein. A display device 168 may include a user interface. A “user interface,” as used herein, is a means by which a user and a computer system interact, for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A “graphical user interface (GUI),” as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pulldown menu may appear. The menu bar may include a plurality of parking recommendations 152 that the user can select from. In an embodiment, the user may filter the spatial recommendations 152 according to one or more criteria that have been selected by the user. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A “widget,” as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
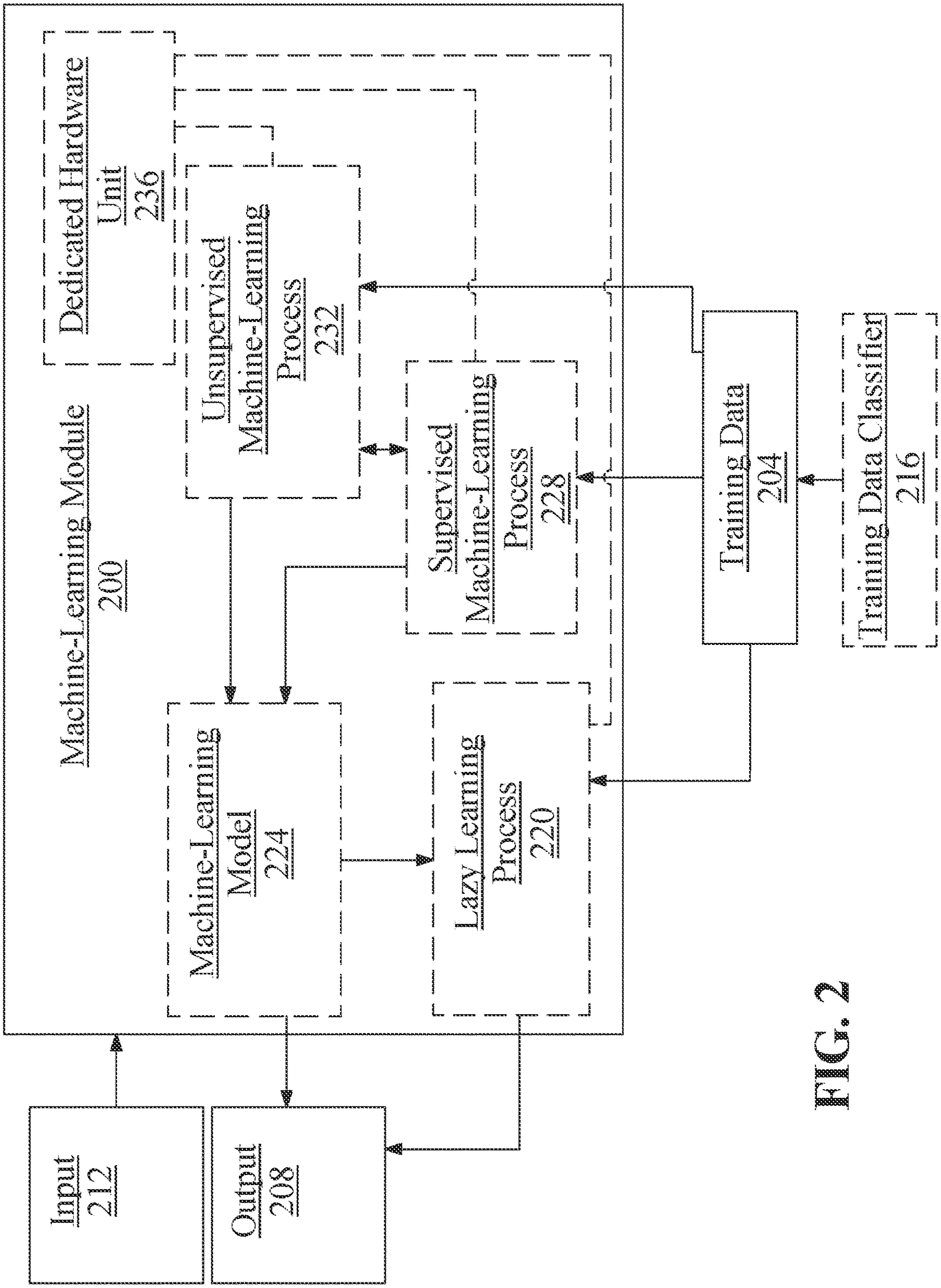
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, a plurality of spatial recommendation 152 and current locations 120 as inputs correlated to examples of pathway 156 as outputs.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data associated with pathways 156 that have been blocked/restricted due to traffic or road closures.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identify as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include plurality of spatial recommendation 152 and current locations 120 as described above as inputs, pathways 156 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task clastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
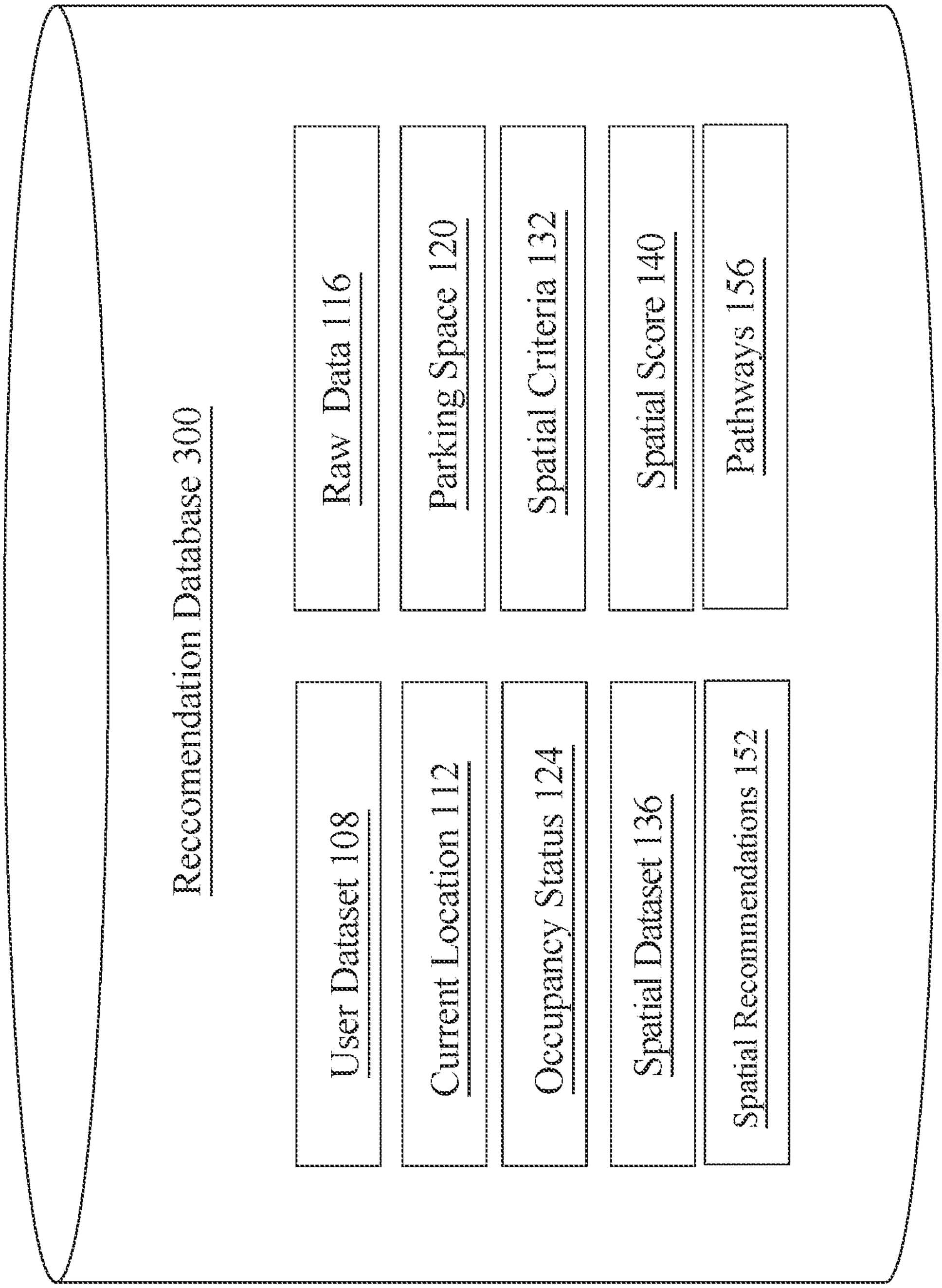
FIG. 3 is a block diagram of an exemplary embodiment of a recommendation database.

Now referring to FIG. 3, an exemplary recommendation database 300 is illustrated by way of block diagram. In an embodiment, any past or present versions of any data disclosed herein may be stored within the Recommendation database 300 including but not limited to: raw data 116, user datasets 108, spatial criteria 132, occupancy status 124, spatial scores 140, spatial clusters, current location 112, spatial recommendations 152, pathways 156, spatial dataset 136, and the like. Processor 104 may be communicatively connected with Recommendation database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. Recommendation database 300 may be implemented, without limitation, as a relational database, a key-value retrieval database such as a NOSQL database, or any other format or structure for use as a database that a person skilled in the art would recognize as suitable upon review of the entirety of this disclosure. Recommendation database 300 may alternatively or additionally be implemented using a distributed data storage protocol and/or data structure, such as a distributed hash table or the like. Recommendation database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
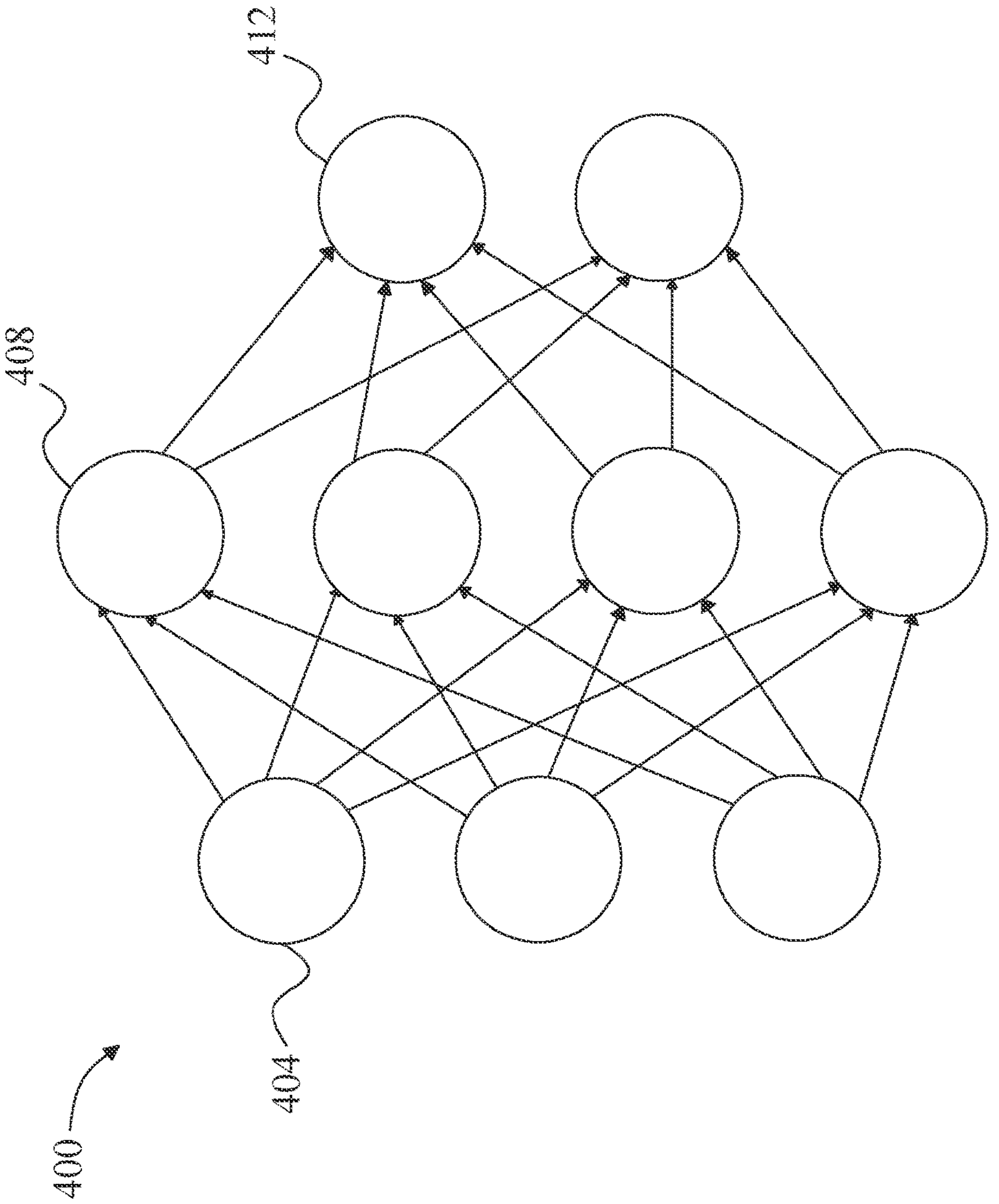
FIG. 4 is a diagram of an exemplary embodiment of a neural network.

Referring now to FIG. 4, an exemplary embodiment of neural network 400 is illustrated. A neural network 400, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
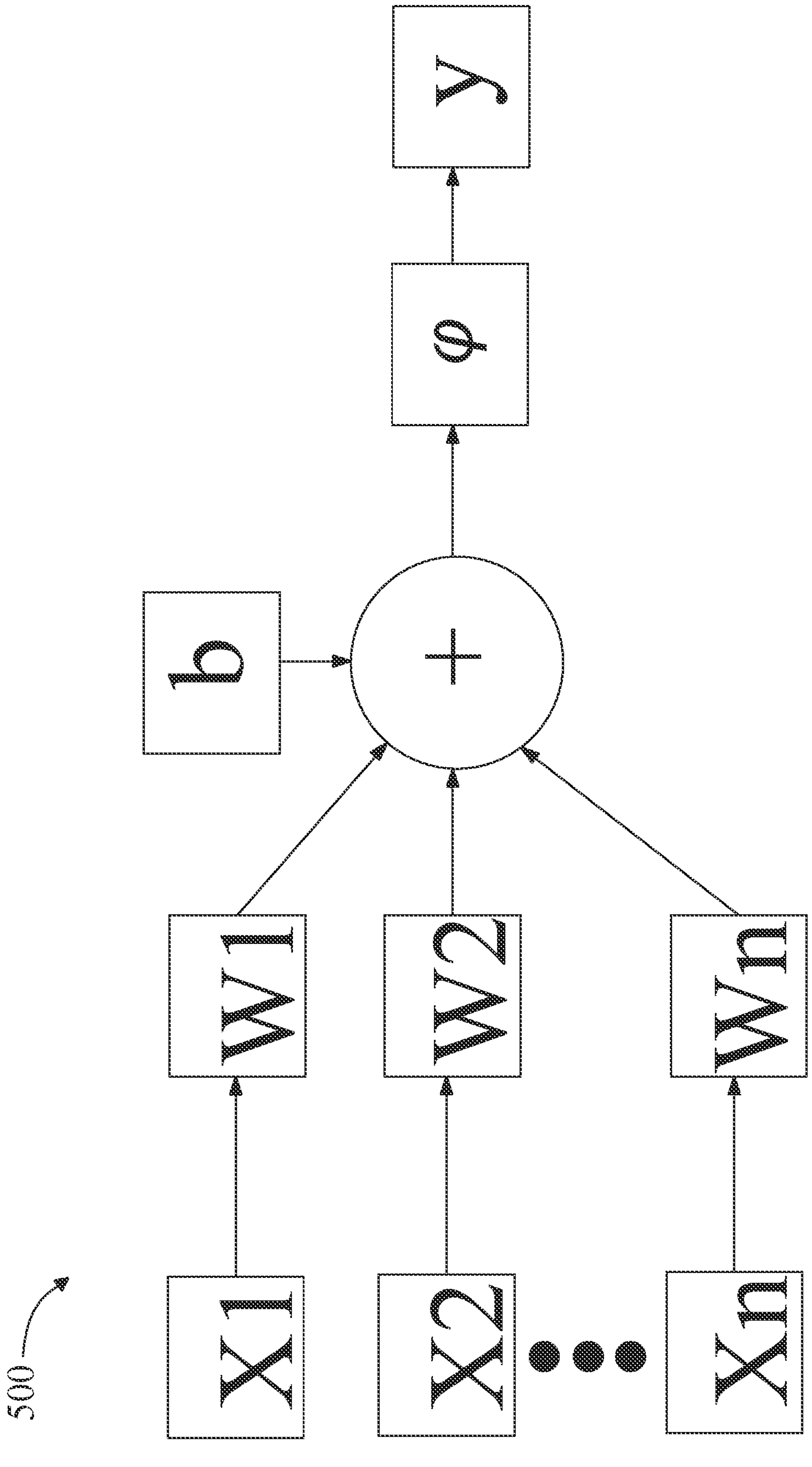
FIG. 5 is a diagram of an exemplary embodiment of a node of a neural network.

Referring now to FIG. 5, an exemplary embodiment of a node of a neural network is illustrated. A node may include, without limitation, a plurality of inputs x; that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
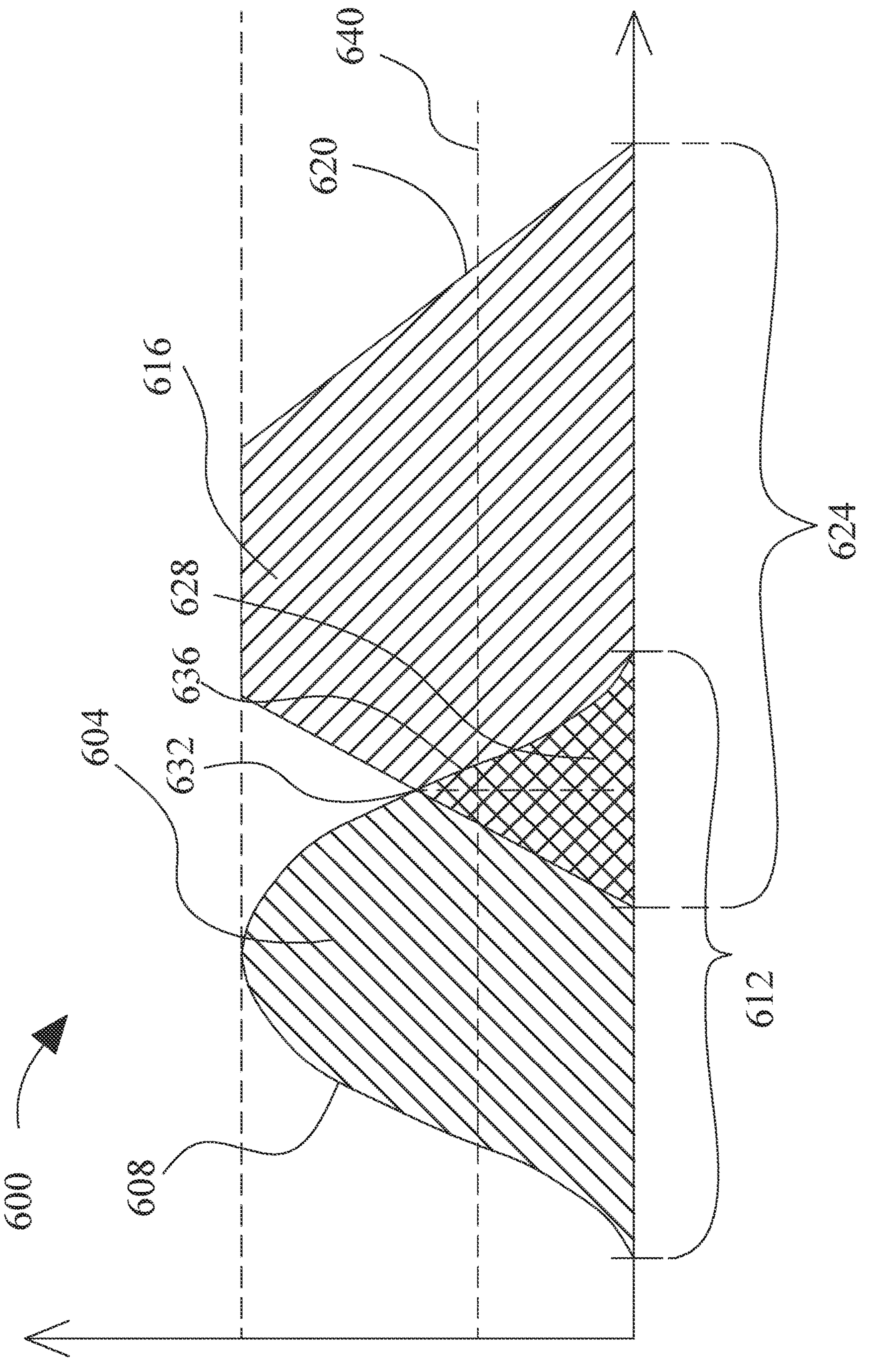
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent a raw data 116 and a spatial criterion 132 from FIG. 1.

Alternatively or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input raw data 116 and spatial criterion 132. For instance, an acceptance variable may represent a first measurable value pertaining to the classification of raw data 116 to spatial criterion 132. Continuing the example, an output variable may represent spatial score 140 associated with the user. In an embodiment, raw data 116 and/or spatial criterion 132 may be represented by their own fuzzy set. In other embodiments, the classification of the data into spatial score 140 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any raw data 116 and spatial criterion 132. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively, or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, the classification into one or more query categories may indicate a sufficient degree of overlap with fuzzy set representing raw data 116 and spatial criterion 132 for combination to occur as described above. Each threshold may be established by one or more user inputs. Alternatively, or additionally, each threshold may be tuned by a machine-learning and/or statistical process, for instance and without limitation as described in further detail below.

In an embodiment, a degree of match between fuzzy sets may be used to rank one resource against another. For instance, if both raw data 116 and spatial criterion 132 have fuzzy sets, spatial score 140 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
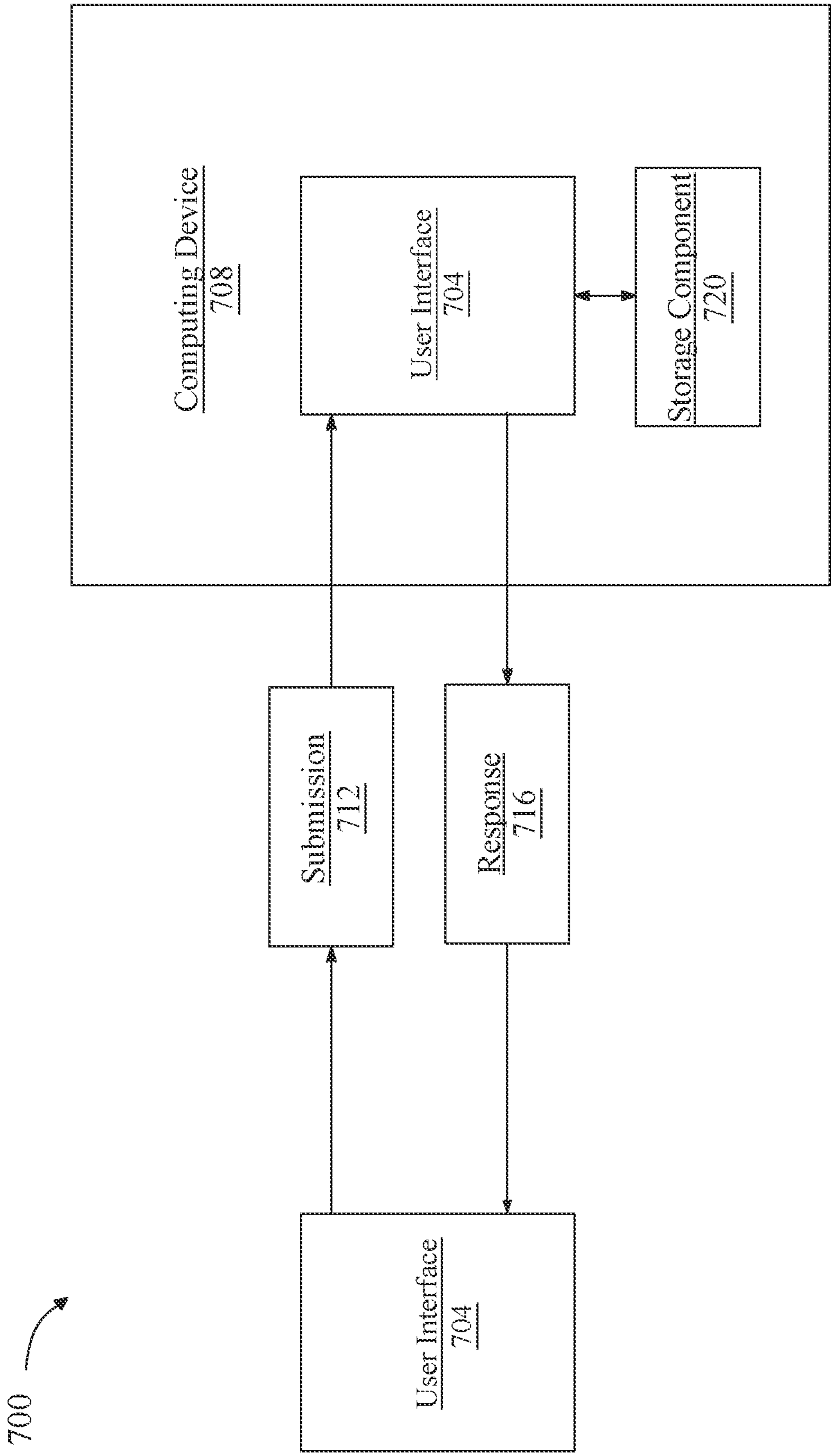
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively, or additionally, in some cases, user interface 704 may remote to computing device 708 and communicative with the computing device 708, by way of one or more networks, such as without limitation the internet. Alternatively, or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both submission 712 and response 716 are text-based communication. Alternatively, or additionally, in some cases, one or both of submission 712 and response 716 are audio-based communication.

Continuing in reference to FIG. 7, a submission 712 once received by computing device 708 operating a chatbot, may be processed by a processor. In some embodiments, processor processes a submission 712 using one or more of keyword recognition, pattern matching, and natural language processing. In some embodiments, processor employs real-time learning with evolutionary algorithms. In some cases, processor may retrieve a pre-prepared response from at least a storage component 720, based upon submission 712. Alternatively, or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry presents within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a candidate or employer inputs in to a chatbot as a response to a prompt or question.

With continuing reference to FIG. 7, computing device 708 may be configured to respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively, or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8A:
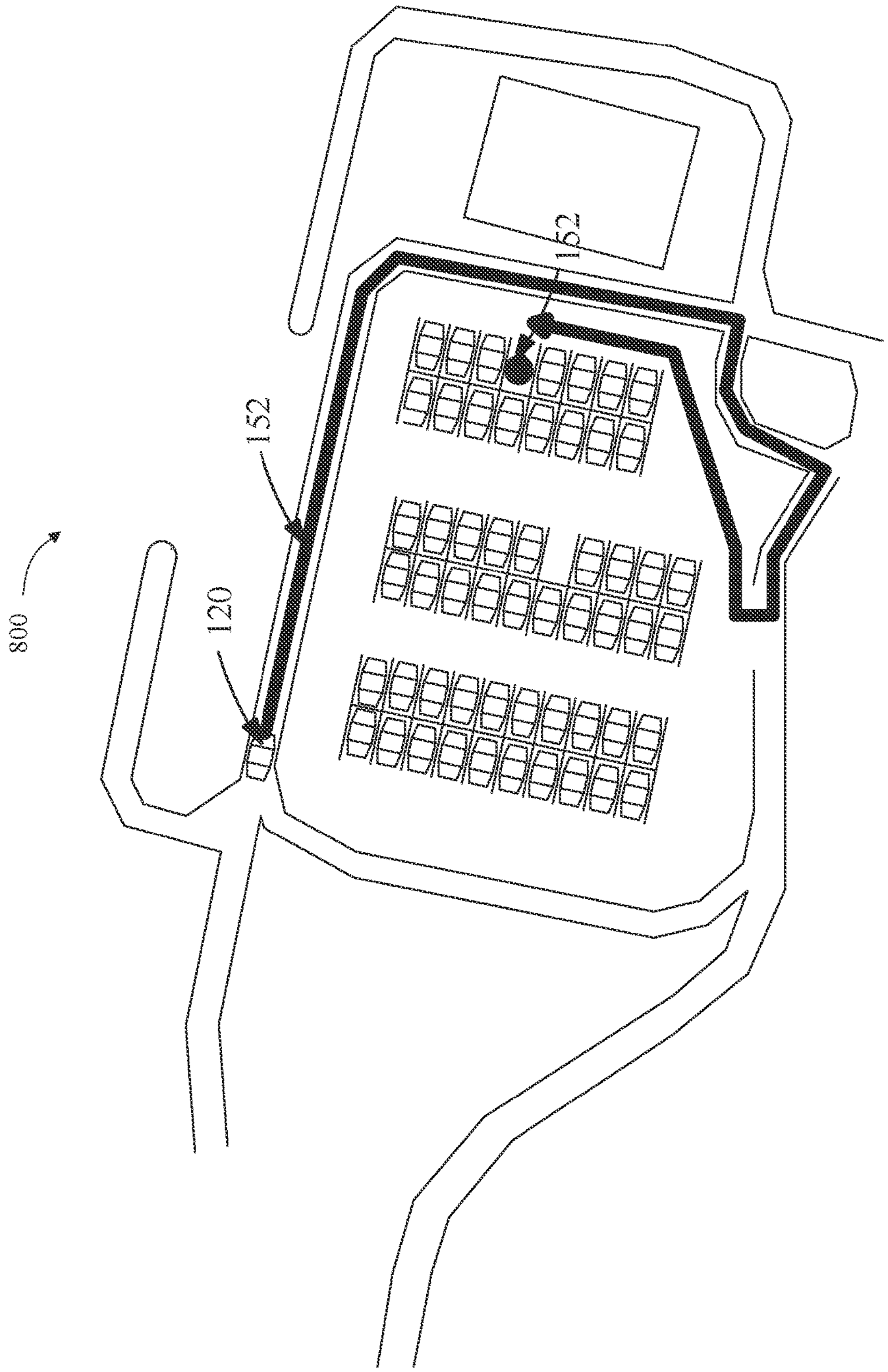
FIG. 8A-C is an illustration of an exemplary graphical user interface.
Figure 8C:
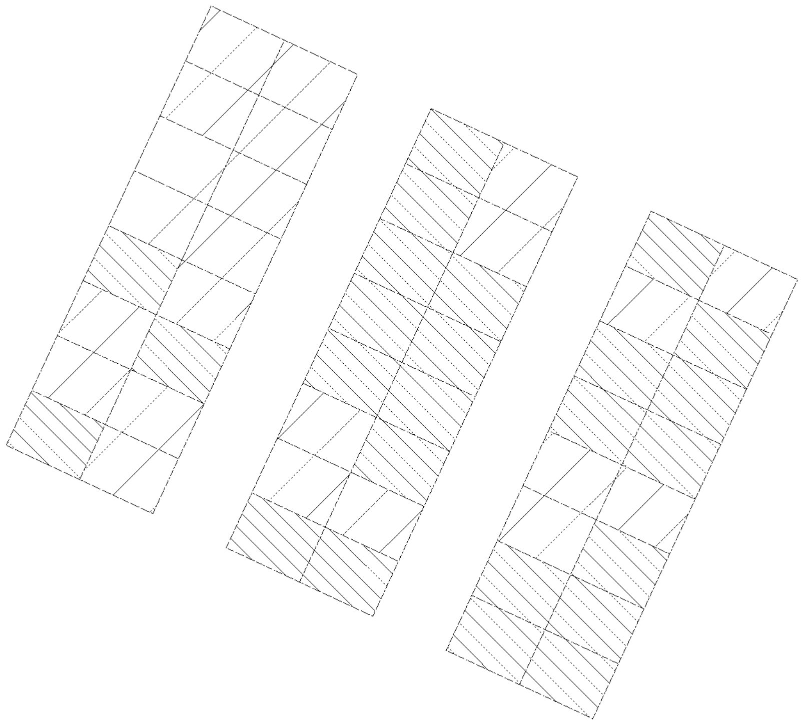
Figure 8B:
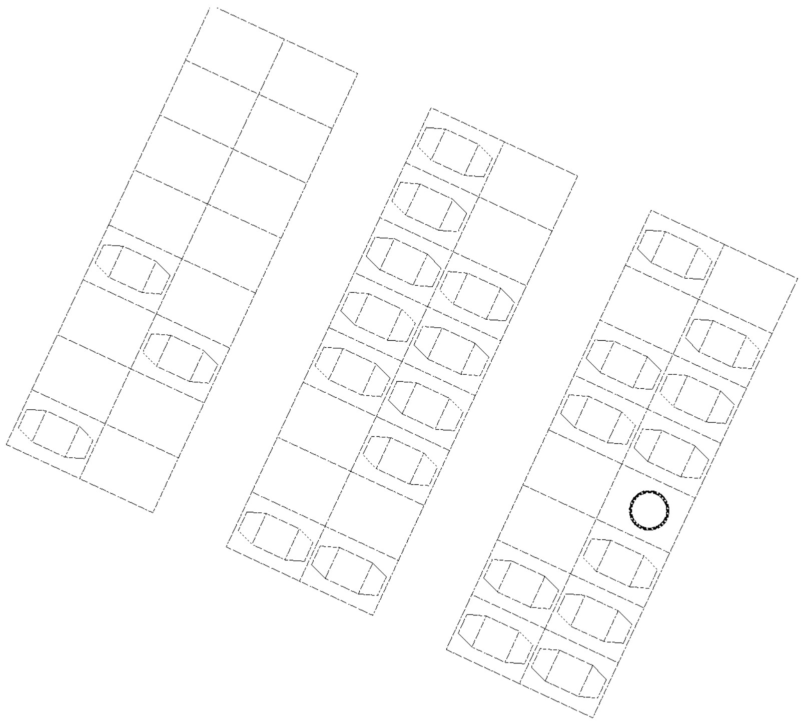

Referring now to FIGS. 8A-C, an illustration of an exemplary graphical user interface 800. The user interface 800 may be configured to display pathway 156. This may include a visual representation of the route from the user's current location 112 to the selected parking space. The user interface 800 may depict a dynamic map that highlights the pathway using clear, distinguishable markers and lines. This map may be interactive, allowing users to zoom in for a closer look at specific segments of the route or zoom out to get an overview of the entire journey. Alongside the visual map, the interface may provide step-by-step navigational instructions, detailing each turn and notable landmark to ensure the user can follow the path with ease. These instructions may be complemented by real-time updates, such as changes in traffic conditions or adjustments to the route, presented in a non-intrusive manner that maintains the user's focus on navigation.

With continued reference to FIGS. 8B-C, the user interface 800 may depict spatial recommendations 152. This may include a clear visualization of available parking spaces, categorized, and marked according to specific classifications. Upon receiving a spatial recommendation, the user may be presented with an interactive map or digital layout of the parking facility, where different types of parking spaces are distinctly marked using color-coded symbols or hashmarks. For instance, electric vehicle (EV) charging spots might be marked with a green lightning bolt icon, handicapped-accessible spots with the universal blue wheelchair symbol, and VIP or reserved spaces could be highlighted in gold or with a star icon. Each classification of parking space may be accompanied by a brief descriptor or legend on the screen. The user interface may also depict details about the recommended spot, such as its proximity to the destination, estimated walking time, or parking fees, are neatly displayed in an information panel or popup, providing users with all the necessary details to make an informed decision. The interface allows users to interact with the map, offering the ability to select alternative spaces if the recommended one does not meet their needs for any reason.

Figure 9:
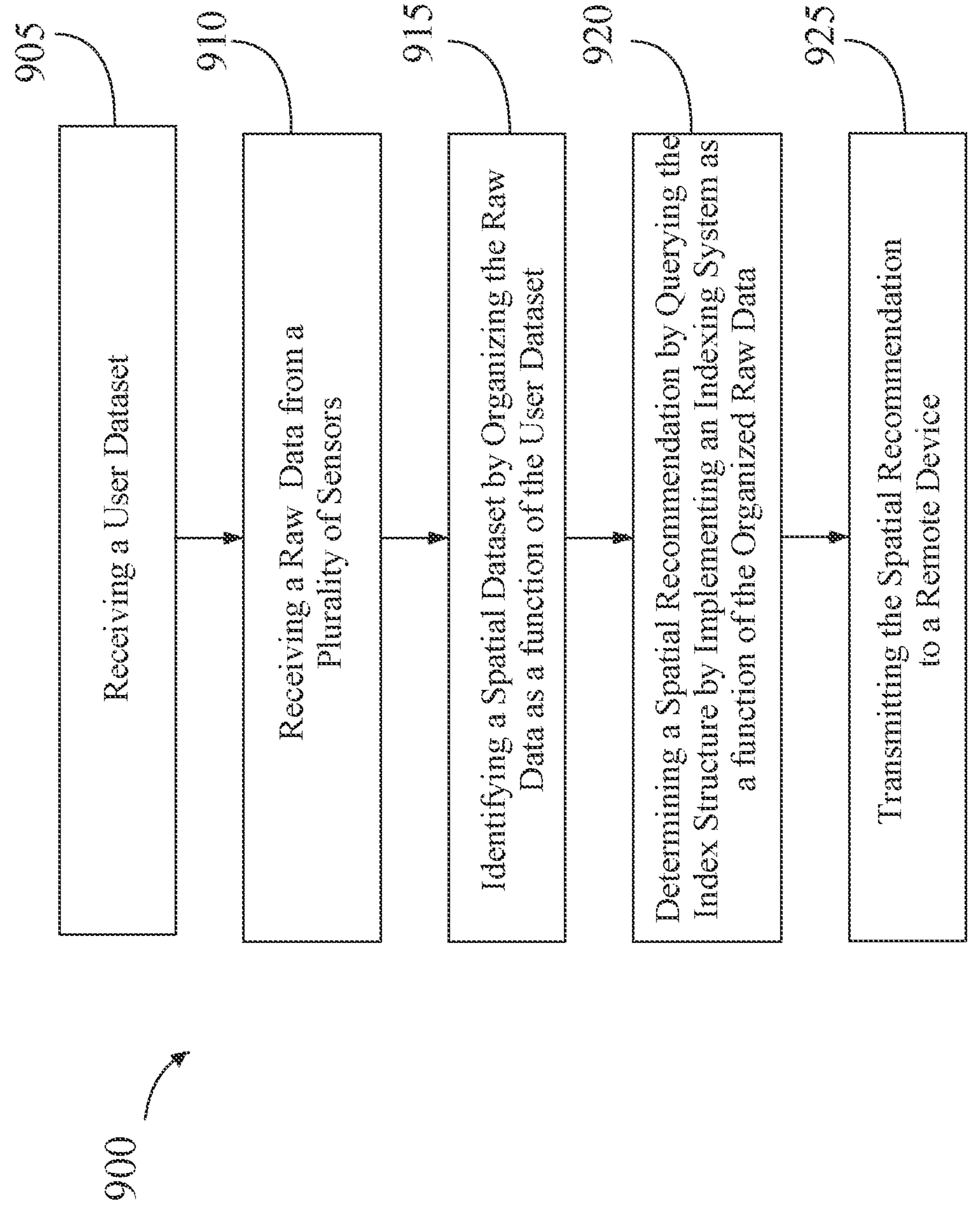
FIG. 9 is a flow diagram of an exemplary method for generating a spatial recommendation.

Referring now to FIG. 9, a flow diagram of an exemplary method 900 for generating a spatial recommendation is illustrated. At step 905, method 900 includes receiving, using at least a processor, a user dataset. This may be implemented as described and with reference to FIGS. 1-8. In an embodiment, the method may include generating, using the at least a processor, one or more spatial criteria as a function of the user dataset. Generating the spatial dataset may include generating a spatial score for each parking space of a plurality of parking spaces as a function of a comparison of the raw data to the one or more spatial criteria. In an additional embodiment, receiving the user dataset may include receiving the user dataset using a chatbot.

Still referring to FIG. 9, at step 910, method 900 includes receiving, using the at least a processor, a raw data from a plurality of sensors. This may be implemented as described and with reference to FIGS. 1-8. In an embodiment, the raw data may include an occupancy status of each parking space of the plurality of parking spaces.

Still referring to FIG. 9, at step 915, method 900 includes identifying, using the at least a processor, a spatial dataset by organizing the raw data as a function of the user dataset. This may be implemented as described and with reference to FIGS. 1-8. In an embodiment, the method may include the generating, using the at least a processor, a spatial report as a function of the spatial dataset.

Still referring to FIG. 9, at step 920, method 900 includes storing, using the at least a processor, the spatial dataset in an index structure by implementing an indexing system as a function of the organized raw data, wherein the indexing system is further configured to dynamically adjust the index structure in response to additional raw data. This may be implemented as described and with reference to FIGS. 1-8. In an embodiment, organizing the raw data as a function of the user dataset may include identifying one or more spatial clusters as a function of the user dataset. This may include identifying the one or more spatial clusters using hierarchical clustering.

Still referring to FIG. 9, at step 925, method 900 includes determining, using the at least a processor, a spatial recommendation by querying the index structure. This may be implemented as described and with reference to FIGS. 1-8. In an embodiment, determining the spatial recommendation may include generating a pathway from at least a current location of a user to at least one parking space of a plurality of parking spaces. Generating the pathway may include iteratively training a pathway machine-learning model using pathway training data, wherein pathway training data comprises examples of current locations and examples of parking spaces as inputs correlated to examples of pathways as outputs. Generating the pathway may include generating the pathway from the at least a current location to the at least one parking space of a plurality of parking spaces using the trained pathway machine-learning model.

Still referring to FIG. 9, at step 930, method 900 includes transmitting, using the at least a processor, the spatial recommendation to a remote device. This may be implemented as described and with reference to FIGS. 1-8. In an embodiment, transmitting the spatial recommendation may include transmitting the spatial recommendation using a message queuing telemetry transport (MQTT).

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
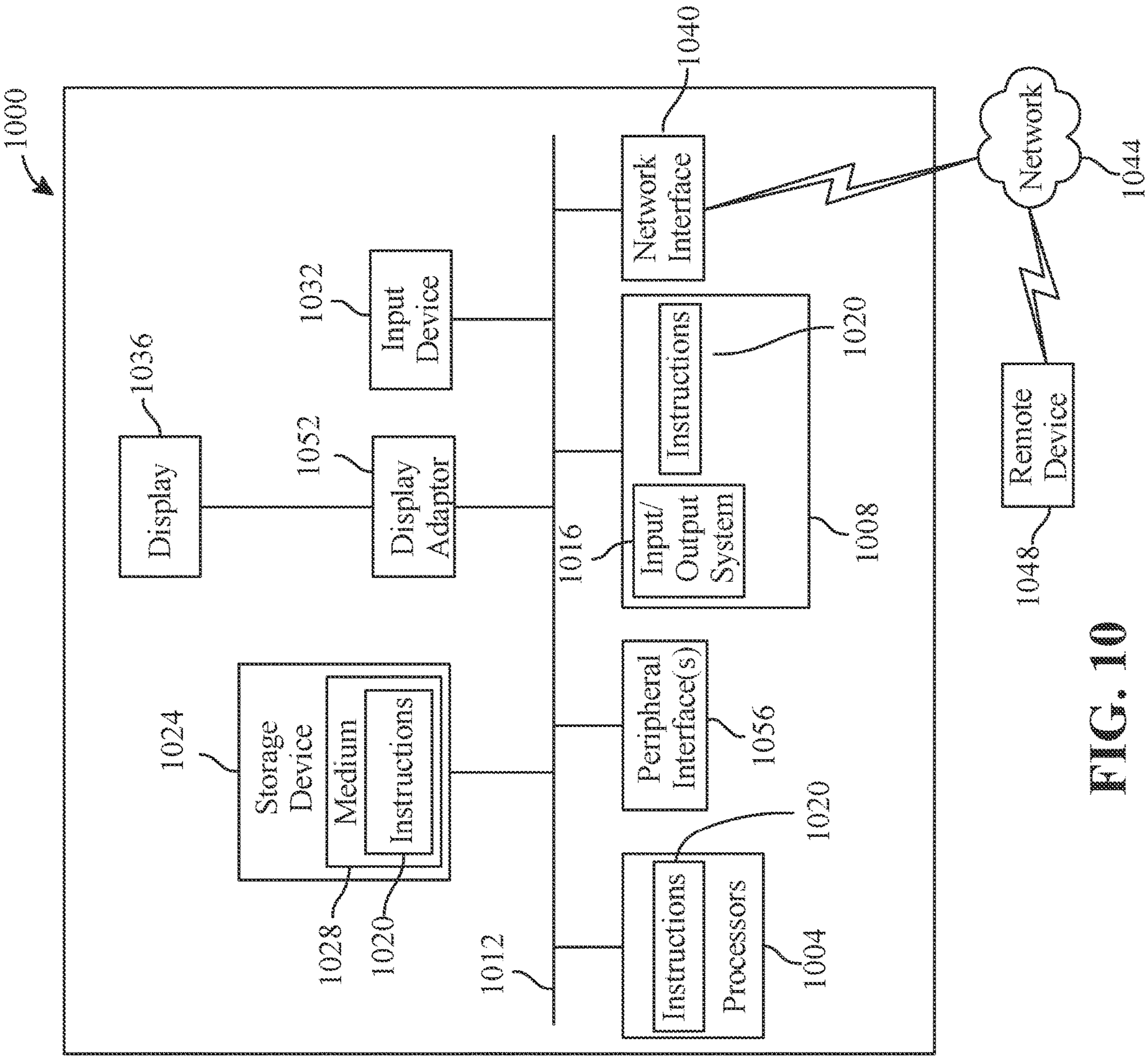
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for generating a spatial recommendation, wherein the apparatus comprises:

at least a processor; and a memory communicatively connected to the at least a processor, wherein the memory contains instructions configuring the at least a processor to:

receive a user dataset;

receive raw data from a plurality of sensors, wherein the raw data comprises at least an occupancy status associated with each storage space of a plurality of storage spaces, wherein the at least an occupancy status signifies at least an availability restriction;

identify a spatial dataset by organizing the raw data;

store the spatial dataset in an index structure by implementing an indexing system as a function of the organized raw data, wherein the indexing system is configured to dynamically adjust the index structure in response to additional raw data;

determine a spatial recommendation as a function of at least a portion of the spatial dataset obtained by querying the index structure as a function of the user dataset; and transmit the spatial recommendation to a remote device.

2. The apparatus of claim 1, wherein the raw data comprises an occupancy status of each storage space of a plurality of storage spaces.

3. The apparatus of claim 1, wherein the memory contains instructions configuring the at least a processor to generate one or more spatial criteria as a function of the user dataset.

4. The apparatus of claim 3, wherein generating the spatial dataset comprises:

generating a spatial score for each storage space of a plurality of storage spaces as a function of a comparison of the raw data to the one or more spatial criteria.

5. The apparatus of claim 1, wherein:

the spatial recommendation comprises a location of at least a storage space of the plurality of storage spaces; and the memory contains instructions configuring the at least a processor to generate a pathway from at least a current location of a user to the location of the at least one storage space of the plurality of storage spaces.

6. The apparatus of claim 1, wherein determining the spatial recommendation comprises:

iteratively training a recommendation machine-learning model using recommendation training data, wherein recommendation training data comprises examples of spatial datasets as inputs correlated to examples of spatial recommendations as outputs; and determining the spatial recommendation as a function of the at least a portion of the spatial dataset using the recommendation machine-learning model.

7. The apparatus of claim 1, wherein querying the index structure comprises identifying one or more spatial clusters as a function of the user dataset.

8. The apparatus of claim 7, wherein identifying the one or more spatial clusters comprises identifying the one or more spatial clusters using hierarchical clustering.

9. The apparatus of claim 1, wherein transmitting the spatial recommendation comprises transmitting the spatial recommendation using a message queuing telemetry transport (MQTT).

10. The apparatus of claim 1, wherein memory further instructs the processor to generate a spatial report as a function of the spatial dataset.

11. A method for generating a spatial recommendation, wherein the method comprises:

receiving, using at least a processor, a user dataset;

receiving, using the at least a processor, raw data from a plurality of sensors, wherein the raw data comprises at least an occupancy status associated with each storage space of a plurality of storage spaces, wherein the at least an occupancy status signifies at least an availability restriction;

identifying, using the at least a processor, a spatial dataset by organizing the raw data;

storing, using the at least a processor, the spatial dataset in an index structure by implementing an indexing system as a function of the organized raw data, wherein the indexing system is further configured to dynamically adjust the index structure in response to additional raw data;

determining, using the at least a processor, a spatial recommendation as a function of at least a portion of the spatial dataset obtained by querying the index structure as a function of the user dataset; and transmitting, using the at least a processor, the spatial recommendation to a remote device.

12. The method of claim 11, wherein the raw data comprises an occupancy status of each storage space of a plurality of storage spaces.

13. The method of claim 11, wherein the method further comprises generating, using the at least a processor, one or more spatial criteria as a function of the user dataset.

14. The method of claim 13, wherein generating the spatial dataset comprises generating a spatial score for each storage space of a plurality of storage spaces as a function of a comparison of the raw data to the one or more spatial criteria.

15. The method of claim 11, wherein:

the spatial recommendation comprises a location of at least a storage space of a plurality of storage spaces; and the method further comprises generating, using the at least a processor, a pathway from at least a current location of a user to the location of the at least one storage space of the plurality of storage spaces.

16. The method of claim 11, wherein determining the spatial recommendation comprises:

iteratively training a recommendation machine-learning model using recommendation training data, wherein recommendation training data comprises examples of spatial datasets as inputs correlated to examples of spatial recommendations as outputs; and determining the spatial recommendation as a function of the at least a portion of the spatial dataset using the recommendation machine-learning model.

17. The method of claim 11, wherein organizing the raw data as a function of the user dataset comprises identifying one or more spatial clusters as a function of the user dataset.

18. The method of claim 17, wherein querying the index structure comprises identifying the one or more spatial clusters using hierarchical clustering.

19. The method of claim 11, wherein transmitting the spatial recommendation comprises transmitting the spatial recommendation using a message queuing telemetry transport (MQTT).

20. The method of claim 11, wherein the method further comprises generating, using the at least a processor, a spatial report as a function of the spatial dataset.

* * * * *